(12) United States Patent
Paweletz et al.

(10) Patent No.: US 8,647,224 B2
(45) Date of Patent: Feb. 11, 2014

(54) GENERATOR ARRANGEMENT FOR A WIND POWER PLANT

(75) Inventors: Anton Paweletz, Fellbach (DE);
Heinz-Josef Tenberge, Sprockhoevel (DE)

(73) Assignee: Robert Bosch GmbH, Stuttgart, DE (US)

( * ) Notice: Subject to any disclaimer, the term of this patent is extended or adjusted under 35 U.S.C. 154(b) by 91 days.

(21) Appl. No.: 13/140,655

(22) PCT Filed: Nov. 20, 2009

(86) PCT No.: PCT/EP2009/008271
§ 371 (c)(1),
(2), (4) Date: Oct. 3, 2011

(87) PCT Pub. No.: WO2010/069449
PCT Pub. Date: Jun. 24, 2010

(65) Prior Publication Data
US 2012/0032450 A1   Feb. 9, 2012

(30) Foreign Application Priority Data

Dec. 19, 2008   (DE) .................. 10 2008 063 875

(51) Int. Cl.
*F16H 48/06*   (2006.01)
(52) U.S. Cl.
USPC ........................................................ 475/149
(58) Field of Classification Search
USPC .............. 475/149, 150, 331; 416/170 R, 171; 290/44, 1 C, 55
See application file for complete search history.

(56) References Cited

U.S. PATENT DOCUMENTS 6,459,165 B1 *  10/2002  Schoo ........................ 290/1 C
8,188,613 B2 *  5/2012  Lee ............................... 290/54

FOREIGN PATENT DOCUMENTS

| DE | 102 42 703 | | 3/2004 |
|---|---|---|---|
| DE | 102 42 707 | B3 | 4/2004 |
| DE | 103 18 945 | B3 | 10/2004 |
| DE | 10 2004 005 543 | | 9/2005 |
| EP | 1 677 005 | | 7/2006 |

OTHER PUBLICATIONS

International Search Report corresponding to PCT Application No. PCT/EP2009/008271, mailed Nov. 15, 2010 (German and English language document) (5 pages).

* cited by examiner

*Primary Examiner* — David D Le
*Assistant Examiner* — David J Hlavka
(74) *Attorney, Agent, or Firm* — Maginot, Moore & Beck

(57) ABSTRACT

A generator arrangement for a wind power plant includes a ring-shaped primary part, a ringshaped secondary part, and a planetary transmission arrangement disposed inside the primary part and the secondary part. The planetary transmission arrangement comprises an internal gear, a sun gear, and at least two planet gears. The sun gear is substantially ring-shaped, having an inner wall, and outer wall, and a web connecting the inner wall and the outer wall. The internal gear is disposed between the inner wall and the outer wall of the sun gear and is supported at the outer wall of the sun gear.

12 Claims, 2 Drawing Sheets

GENERATOR ARRANGEMENT FOR A WIND POWER PLANT

This application is a 35 U.S.C. §371 National Stage Application of PCT/EP2009/008271, filed Nov. 20, 2009, which claims the benefit of priority to Application Serial No. DE 10 2008 063 875.7, filed Dec. 19, 2008 in Germany.

BACKGROUND

The present disclosure relates to a generator arrangement for a wind energy installation.

A large proportion of known wind energy installations are equipped with high-speed generators, with a single-step or multiple-step gearbox being used to step up the relatively slow speed of rotation of the wind turbine to the generator speed of revolution. Solutions are known in which a gearbox and generator are arranged one behind the other as separate assemblies on a machine support. This allows the components to be replaced easily in the event of damage, but the overall arrangement is relatively large and heavy, leading to problems relating to transport to the nacelle of the wind energy installation and the arrangement therein.

Furthermore, arrangements are known in which a gearbox arrangement is arranged at least partially within the generator, thus leading to space saving. Exemplary solutions are disclosed in DE 102 42 703 B3 or DE 10 2004 005 543 A1. However, these solutions have the disadvantage of the complexity of the mutual bearing of the individual gearbox and generator elements. In this case, two bearings are normally provided for each gearbox degree of freedom, that is to say the number of possible independent movements. For example, in the cited DE 102 42 707 B3 the sun gear and the ring gear are each mounted in a duplicated form on the planet support, as a result of which the gearbox arrangement has a total of four bearings.

SUMMARY

Against the background of the cited prior art, the object is therefore to specify a generator arrangement having an at least partially integrated gearbox for a wind energy installation, which is of compact design and requires as few bearings as possible.

This object is achieved by a generator arrangement for a wind energy installation having the features and advantageous refinements described herein.

A generator arrangement according to the disclosure for a wind energy installation has an annular primary part, an annular secondary part and an epicyclic gearbox arrangement which is arranged within the primary parts and the secondary part. The epicyclic gearbox arrangement comprises a ring gear, a sun gear and at least two planet gears. The sun gear is essentially in the form of an annular shell with an inner wall, an outer wall and a web which connects the inner wall and the outer wall. The ring gear is arranged between the inner wall and the outer wall of the sun gear, and is mounted on the outer wall of the sun gear.

The teaching according to the disclosure relates in particular to the arrangement of the ring gear within the annular shell of the sun gear, such that a bearing can be provided between the ring gear and the sun gear. This makes it possible to dispense with complex, possibly duplicated, bearing of the sun gear with respect to the planet gears or the planet support, as is usual in the prior art. This makes it possible to reduce the number of bearings required, thus simplifying assembly leading to cost and weight reduction.

The ring gear is advantageously mounted on a planet support. In this advantageous refinement, a total of only two bearings are required for the gearbox arrangement, that is to say the bearing between the ring gear and the sun gear, and the bearing between the ring gear and the planet support. By way of example, two bearings can therefore be saved in comparison with the prior art as explained in more detail in the introductory part of the description. A gearbox arrangement can therefore be provided in which fewer bearings are required than the number of degrees of freedom, since some of the gearbox elements support one another.

The at least two planet gears expediently roll between the ring gear and the inner wall of the sun gear. This makes it possible to provide a compact design, in which the size of the sun gear, that is to say the diameter which is defined by the outer wall, is independent of the arrangement of the planet gears.

In one refinement, the annular secondary part is arranged on the outer wall of the sun gear. This makes it possible to provide direct power transmission or torque transmission from the gearbox to the secondary part, or the rotor of the generator. Depending on the configuration of the generator, for example synchronous or asynchronous, or with permanent-magnet or electrical excitation, etc. the sun gear can be used to guide the magnetic flux and/or to carry electric current, or the sun gear avoids guidance of magnetic flux and/or electric current. Where necessary, it is therefore possible to dispense with additional magnetically permeable and/or electrically conductive elements. Alternatively or additionally, the design of the sun gear can be matched to a desired flux guidance. In particular, the possibility to dispense with additional elements allows a further weight ceiling to be achieved.

According to one particularly preferred refinement, the ring gear is essentially in the form of an annular shell with an inner wall, an outer wall and a web which connects the inner wall and the outer wall, wherein the annular primary parts and the annular secondary parts are arranged between the inner wall and the outer wall of the ring gear. This makes it possible to dispense with a separate housing, which leads to a significant space and weight saving. In other words, the housing is provided by the ring gear itself. When using a ring gear in the form of an annular shell, the inner wall of the ring gear is expediently mounted on the planet support and/or the at least two planet gears roll between the inner wall of the ring gear and the inner wall of the sun gear. This allows a further space saving to be achieved, since the size of the gearbox is defined substantially by the diameter of the inner wall of the ring gear.

The annular primary part is advantageously arranged on the outer wall of the ring gear. In consequence, it is possible to dispense with separate support elements, since the primary part is arranged directly on the ring gear, and there is no need for a housing.

In one refinement, the epicyclic gearbox arrangement is preceded by a second gearbox arrangement, in particular a two-step gearbox. The high step-ratio, as required for generators, can therefore be provided overall, requiring less space and weight than in the case of known three-step gearboxes followed by a generator.

The second gearbox arrangement and the ring gear are expediently connected by means of at least one elastic element. On the one hand, this makes it possible to ensure that the second gearbox arrangement and the epicyclic gearbox arrangement can be provided independently of one another and only have to be connected to one another at the installation location. The elastic elements are used inter alia to provide springing for torque surges.

The planet support can be subdivided into an input-drive part and output drive part, wherein the input-drive part is arranged on the second gearbox arrangement, and the output-drive part is arranged on the epicyclic gearbox arrangement. This makes it possible to ensure that the epicyclic gearbox arrangement can subsequently be separated easily from the second gearbox arrangement. The input-drive part and the output drive part are detachably connected to one another for this purpose.

According to one particularly preferred embodiment, the generator is in the form of a doubly-fed asynchronous generators. Generators such as these are particularly suitable for wind energy installations, since they are robust and reliable, and are not subject to demagnetization of permanent-magnet components. In this refinement, the sun gear is equipped with sliprings, in order to allow an electrical power supply to be provided for the secondary part. The sun gear may in particular be partially hollow, in order to carry cables.

According to a likewise preferred embodiment, the generator is in the form of a permanent-magnet synchronous generator. Generators of this type are also used frequently in wind energy installations, since there is no need for sliprings, brushes etc. in order to make contact with the secondary part.

The disclosure allows a generator arrangement to be provided having a light and compact gearbox, which requires few bearing elements, in particular because of the small dimension and the low weight. Further advantages and refinements of the disclosure will become evident from the description and the attached drawings.

It is self-evident that the features mentioned above and those which are still to be explained in the following text can be used not only in the respectively stated combination but also in other combinations or on their own, without departing from the scope of the present disclosure.

BRIEF DESCRIPTION OF THE DRAWINGS

The disclosure will be described in detail in the following text with reference to the drawings and the exemplary embodiments, which are schematically illustrated in the drawings.

DETAILED DESCRIPTION

Figure 1:
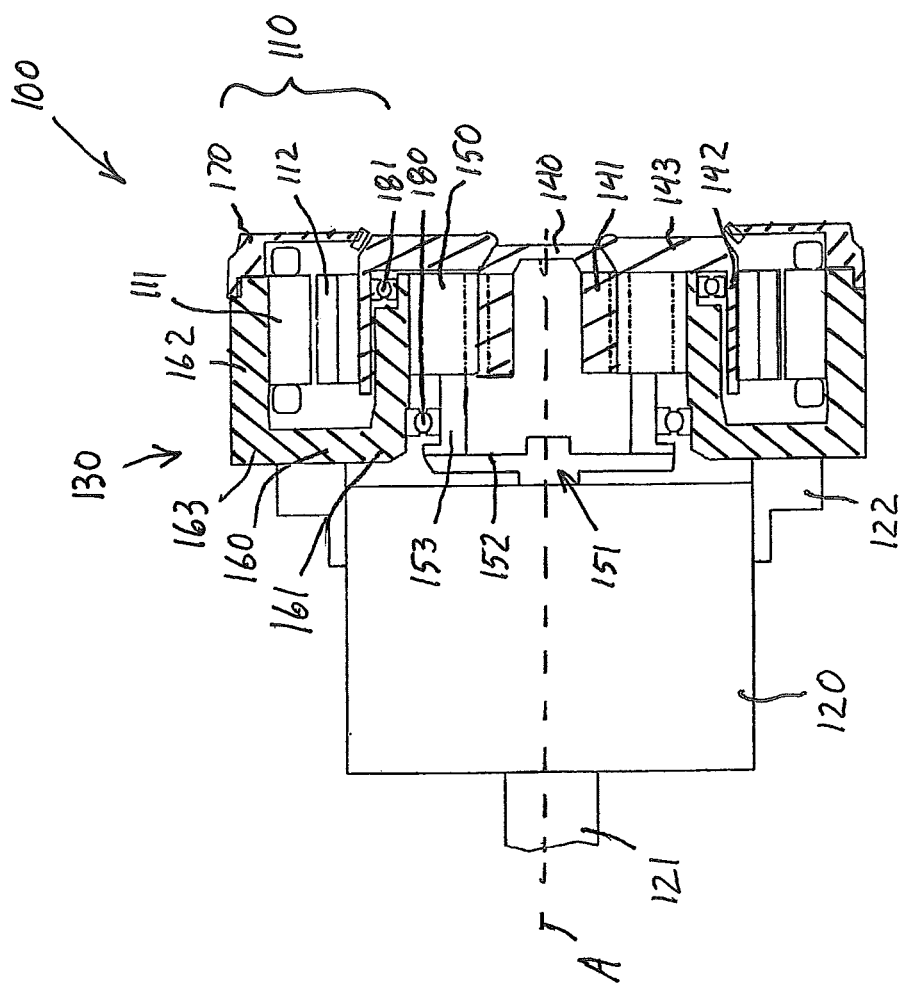
FIG. 1 shows a first preferred embodiment of a generator according to the disclosure, having a permanent-magnet synchronous generator.
Figure 2:
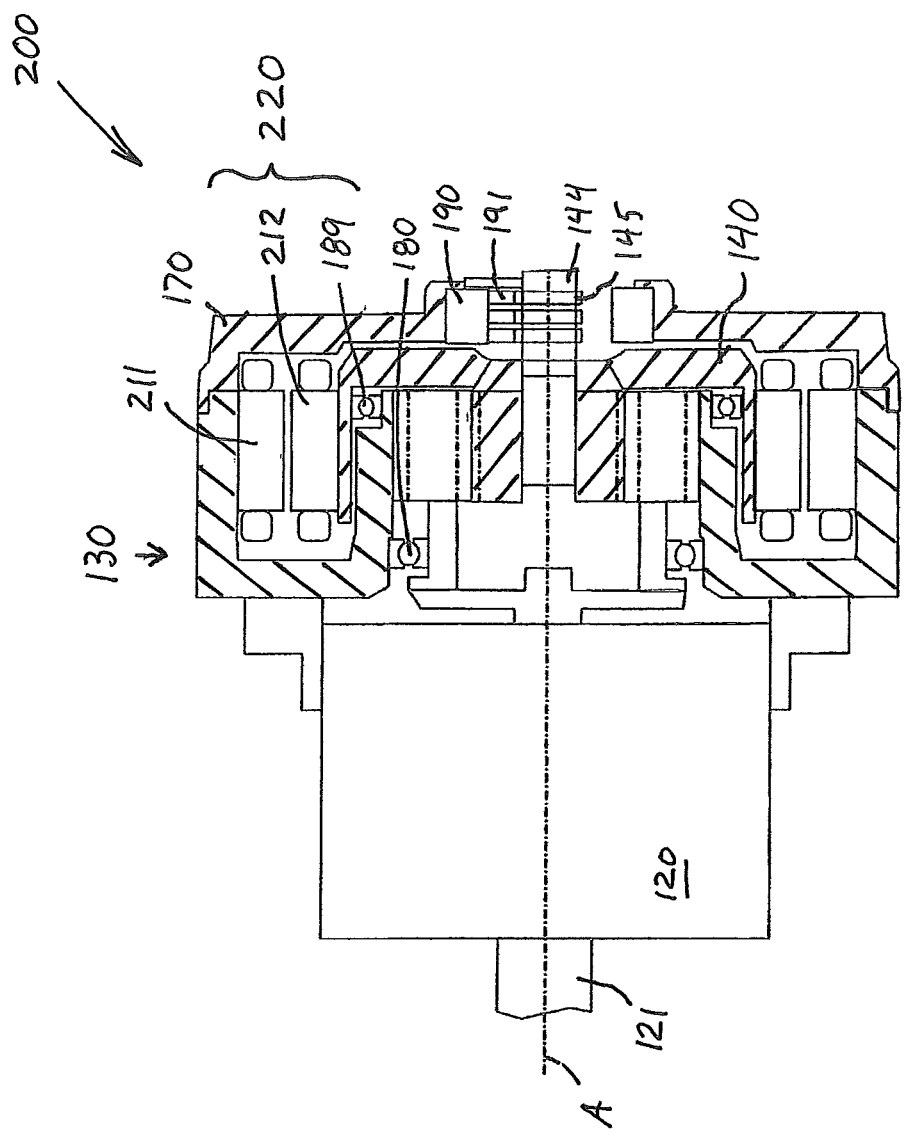
FIG. 2 shows a second preferred embodiment of a generator arrangement according to the disclosure, having a doubly-fed asynchronous generator.

FIGS. 1 and 2 show different embodiments of a generator arrangement according to the disclosure, which will be described generically, however, in the following text, since they contain identical elements or elements having the same effect they are provided with the same reference symbols.

FIG. 1 shows a first preferred embodiment of a generator arrangement according to the disclosure, illustrated schematically in the form of a cross section, and annotated 100 overall. The generator arrangement 100 has a permanent-magnet synchronous generator 110. The generator 110 has a primary part or a stator 111, which has a coil arrangement, and a secondary part or a rotor 112, which has a permanent-magnet arrangement. The stator 111 is equipped with an end winding. The rotor is mounted such that it can rotate about a rotation axis A.

The generator arrangement 100 in the illustration shown has a two-step initial gearbox 120, which is connected to an input-drive shaft 121 which comes, for example, from the wind turbine. The generator arrangement 100 furthermore has an epicyclic gearbox 130, which is arranged substantially within the rotor 112. The initial gearbox 120 and the epicyclic gearbox 130 are connected by means of elastic elements 122.

The epicyclic gearbox 130 has a sun gear 140, planet gears 150 and a ring gear 160 with an internal tooth system. The planet gears 150 are arranged on a planet support 151, which is driven by the initial gearbox 120. The ring gear 160 is arranged such that it cannot rotate and is at the same time used as a housing for the epicyclic gearbox 130 and for the generator 110. The housing formed by the ring gear 160 is provided with a cover 170.

The planet support 151 has an input-drive part 152, which is connected to the initial gearbox 120, and an output-drive part 153, which is connected to the epicyclic gearbox. The input-drive part 152 and the output-drive part 153 of the planet support 151 are detachably connected to one another. This allows the initial gearbox 120 be easily separated from the epicyclic gearbox 130.

The sun gear 140 has an inner wall 141 and outer wall 142, which are connected by a web 143. The sun gear is therefore essentially in the form of an annular shell. The ring gear 160 likewise has an inner wall 161, an outer wall 162 and a web 163 which connects the inner wall and the outer wall. The ring gear 160 is therefore also essentially in the form of an annular shell.

The planet gears 150 roll between the inner wall 141 of the sun gear and the inner wall 161 of the hollow gear. The rotor 112 is fitted to the outer wall 142 of the sun gear 140. The stator 111 is fitted to the outer wall 162 of the ring gear 160.

The ring gear 160, to be more precise the inner wall 161 of the ring gear 160, is mounted on a bearing 180 with respect to the planet support 151. The ring gear 160, to be more precise the inner wall 161 of the ring gear 160, is also mounted on a bearing 181 with respect to the outer wall 142 of the sun gear 140. In addition, the inner wall 161 of the ring gear 160, the planet gears 150 and the inner wall 141 of the sun gear 140 support one another.

FIG. 2 shows a second preferred embodiment of a gearbox arrangement according to the disclosure, illustrated schematically in the form of a cross section, and annotated 200 overall. In contrast to the generator arrangement 100 from FIG. 1, the generator arrangement 200 is equipped with a doubly-fed asynchronous generator 220. The generator 220 has a primary part or a stator 211 and a secondary part or a rotor 212 which are each provided with end windings. The stator 211 is in turn attached to the outer wall 162 of the ring gear 160. The rotor 212 is likewise in turn attached to the outer wall 142 of the sun gear 140.

Since the generator 220 is in the form of an asynchronous generator, an electrical power supply is required to the rotor 212. For this purpose, the sun gear 140 has a hub 144, which is provided with sliprings 145. Brushes 191 of an electrical pick-up 190 act on the sliprings 145.

The preferred embodiment of the disclosure therefore makes it possible to provide a compact epicyclic gearbox within a generator 110 or 210, which has three gearbox degrees of freedom, although only two bearings 180 and 181 are required as bearings for the gearbox gears 140, 150, 151 and 160. This makes it possible to avoid friction losses, bearing inaccuracies, efficiency losses, etc. Furthermore, this considerably reduces the gearbox maintenance effort.

It is self-evident that the figures shown illustrate only exemplary embodiments of the disclosure. In addition, any other embodiment is feasible, without departing from the scope of this disclosure.

The invention claimed is:

1. A generator arrangement for a wind energy installation comprising:
   an annular primary part;
   an annular secondary part; and
   an epicyclic gearbox arrangement, which is arranged within the primary part and the secondary part,
   wherein the epicyclic gearbox arrangement has a ring gear, a sun gear, and at least two planet gears,
   wherein the sun gear is in the form of an annular shell with an inner wall, an outer wall, and a web which connects the inner wall and the outer wall, and
   wherein the ring gear is arranged between the inner wall and the outer wall of the sun gear, and is supported by the outer wall of the sun gear.

2. The generator arrangement as claimed in claim 1, wherein the ring gear is further supported by a planet support configured for supporting the at least two planet gears.

3. The generator arrangement as claimed in claim 1, wherein the at least two planet gears roll between the ring gear and the inner wall of the sun gear.

4. The generator arrangement as claimed in claim 1, wherein the annular secondary part is arranged on the outer wall of the sun gear.

5. The generator arrangement as claimed in claim 1, wherein:
   the ring gear is essentially in the form of an annular shell with an inner wall, an outer wall and a web which connects the inner wall and the outer wall, and
   the annular primary part and the annular secondary part are arranged between the inner wall and the outer wall of the ring gear.

6. The generator arrangement as claimed in claim 5, wherein the annular primary part is arranged on the outer wall of the ring gear.

7. The generator arrangement as claimed in claim 1, wherein:
   the epicyclic gearbox arrangement is preceded by a second gearbox arrangement, and
   the second gearbox arrangement is a two-step gearbox.

8. The generator arrangement as claimed in claim 7, wherein the second gearbox arrangement and the ring gear are connected by means of at least one elastic element.

9. The generator arrangement as claimed in claim 7, wherein:
   the planet support can be subdivided into an input-drive part and an output-drive part,
   the input-drive part is arranged on the second gearbox arrangement, and
   the output-drive part is arranged on the epicyclic gearbox arrangement.

10. The generator arrangement as claimed in claim 1, wherein the generator is in the form of a doubly-fed asynchronous generator.

11. The generator arrangement as claimed in claim 1, wherein the generator is in the form of a permanent-magnet synchronous generator.

12. A wind energy installation comprising:
    a generator arrangement including;
       an annular primary part,
       an annular secondary part, and
       an epicyclic gearbox arrangement, which is arranged within the primary part and the secondary part,
    wherein the epicyclic gearbox arrangement has a ring gear, a sun gear, and at least two planet gears,
    wherein the sun gear is in the form of an annular shell with an inner wall, an outer wall, and a web,
    wherein the web connects the inner wall and the outer wall,
    wherein the ring gear is arranged between the inner wall and the outer wall of the sun gear, and
    wherein the ring gear is supported by the outer wall of the sun gear.

* * * * *